United States Patent [19]

Uehara

[11] Patent Number: 4,627,043

[45] Date of Patent: Dec. 2, 1986

[54] HEAD SHIFTING APPARATUS

[75] Inventor: Tsukasa Uehara, Tokyo, Japan

[73] Assignee: Canon Kabushiki Kaisha, Japan

[21] Appl. No.: 567,547

[22] Filed: Jan. 3, 1984

[30] Foreign Application Priority Data

Jan. 7, 1983 [JP] Japan ................... 58-975

[51] Int. Cl.$^4$ .................. G11B 5/47; G11B 21/02
[52] U.S. Cl. ..................... 369/215; 360/78; 369/33
[58] Field of Search .............. 369/33, 215; 360/70, 360/75, 77, 78, 97

[56] References Cited

U.S. PATENT DOCUMENTS

| | | | |
|---|---|---|---|
| 4,290,088 | 9/1981 | Beecroft | 360/75 |
| 4,399,477 | 8/1983 | Bryer | 369/215 |
| 4,473,898 | 9/1984 | Ono | 369/215 |
| 4,488,187 | 12/1984 | Alaimo | 360/77 |
| 4,514,837 | 4/1985 | Rosmalen | 369/215 |

*Primary Examiner*—Steven L. Stephan
*Attorney, Agent, or Firm*—Toren, McGeady, Stanger, Goldberg & Kiel

[57] ABSTRACT

Disclosed is a head shifting apparatus for shifting a head relative to a recording medium, which includes a shifting mechanism for shifting the head stepwise, and detecting apparatus for detecting when the head reaches a predetermined reference position. Control apparatus controls the shifting mechanism in such a manner that the head is shifted in a first shifting mode where the head is shifted on the basis of a predetermined first shifting step unit increment until the head reaches the reference position. Then it performs normal recording or reproducing. The head is shifted in a second shifting mode where it is shifted on the basis of a predetermined second shifting step unit increment larger than the first shifting step unit increment.

25 Claims, 6 Drawing Figures

HEAD SHIFTING APPARATUS

BACKGROUND OF THE INVENTION

1. Field of the Invention

This invention relates to a head shifting apparatus, and more particularly to a head shifting apparatus for shifting a head intermittently or stepwise relative to a recording medium.

2. Description of the Prior Art

Most of the recording or reproducing apparatus of the type using disc-shaped recording media, for example, magnetic sheets, employ a shifting mechanism for advancing the recording or reproducing head, track by track, in a radial direction of the recording medium, including a step motor and a shifting screw connected to the output shaft of the motor. For determining the basic shifting motion increment of the stepping motor in order to improve the precisional accuracy, the technique of shifting of the head by one step for the required advance (equal to each track pitch, for example) is inferior to that obtained by a plurality of steps. The technique of using a plurality of steps applies, for example, when the step motor is of the 4-phase type and four steps for the same track pitch is employed, as is well known in the art. Therefore, in the prior art apparatus, the use of multi-step shifting mechanisms prevails.

Another important aspect of this type of recording or reproducing apparatus is that whether in the recording or reproducing mode, means must be provided for detecting when the head is set at a predetermined reference position relative to the recording medium. As is the common practice in the art, it is through the same number of steps for each track pitch that the head is shifted in a direction to the limit position. The head is then shifted in the opposite direction, track to track. With such shifting control means, however, as will be fully described later, when the shifting steps of the head are disturbed by external disturbances, the head cannot be accurately aligned with the reference position. This leads to poor instrument compatibility.

Therefore, the general object of this invention is to eliminate all the above drawbacks of the prior art apparatus, and to provide a novel head shifting apparatus.

Another object of the invention is to provide a head shifting apparatus enabling the head to be automatically set at a predetermined reference position with remarkably increased accuracy, thereby making it possible to reduce the tracking error on the recording medium and to increase instrument compatibility.

SUMMARY OF THE INVENTION

According to a preferred embodiment in which this aspect of the present invention is realized, a head shifting apparatus is proposed which includes a shifting mechanism for advancing a head stepwise, means for detecting when the head reaches a predetermined reference position and control means for controlling the shifting mechanism in such a manner that the head is shifted in a first shifting mode in which the head is shifted on the basis of a predetermined first unit increment of a shifting step until the detecting means detects that the head has reached the reference position. Then a second shifting mode follows where the head is shifted on the basis of a larger predetermined second unit increment of a shifting step greater than the first increment.

In this case, the control means may control the shifting mechanism so that, for example, when the head is to be reset to the reference position, the head is shifted in the first mode.

Also with the shifting mechanism is constructed so that the head is shifted at predetermined step pitches, the control means may control the shifting mechanism in such a manner that in the first shifting mode, a predetermined first number of steps constitute one unit increment of the head shifting, and in the second shifting mode, a predetermined second number of steps greater than the first number of steps constitutes one unit increment of head shifting.

It is noted that the term "head" herein used includes magnetic heads, optical heads, electrostatic capacity type heads and other recording and reproducing heads for recording signals on recording media and picking up the recorded signals. It further includes printing heads in the printer, read out heads in the readout device, and the like.

Thus, according to the present invention, when the head is shifted toward the reference position, the head is shifted on the basis of a motion shifting step which has a smaller unit increment than that in the normal shifting mode until the head reaches the reference position, whereby accurate head adjustment to the reference position can be performed. This assures that, as the head moves away from the reference position for performing recording or reproducing, each shifted position of the head can be accurately determined.

Other objects and features of the invention will become apparent from the following detailed description of an embodiment thereof in conjunction with the accompanying drawings.

BRIEF DESCRIPTION OF THE DRAWINGS

In the following, a preferred embodiment of the present invention will be described with reference to the accompanying drawings, in which.

DETAILED DESCRIPTION OF THE PREFERRED EMBODIMENTS

Figure 1:
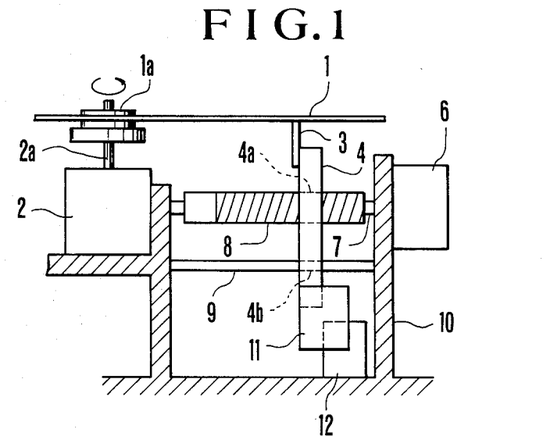
FIG. 1 is a schematic longitudinal sectional view of an embodiment of the head shifting apparatus to which the present invention is applicable.

FIG. 1. illustrates an example of the head shifting apparatus in which the present invention is applicable. A magnetic sheet 1, used as the recording medium, is connected at its center core 1a to an output shaft 2a of an electric motor 2. A recording or reproducing head 3 is fixedly secured to a carriage 4. A step motor 6 has an output shaft 7 on which is fixedly mounted a shifting screw rod 8 and which meshes with a female-threaded portion 4a of the head carriage 4. A guide 9 linearly guides the head carriage 4 as the carriage 4 moves. The carriage 4 engages the guide 9 at its portion 4b. The step motor 6, screw rod 8 and guide 9 are installed on a chassis 10. Therefore, rotation of the output shaft 7 of the step motor 6 is converted by the drive connection of the female-threaded portion 4a of the head carriage 4 and the screw rod 8 to linear motion of the head carriage 4 in a lateral direction as viewed in the drawing, that is, in the radial direction of the magnetic sheet 1, thus shifting the magnetic head 3 stepwise in the radial direction of the magnetic sheet 1.

Figure 4:
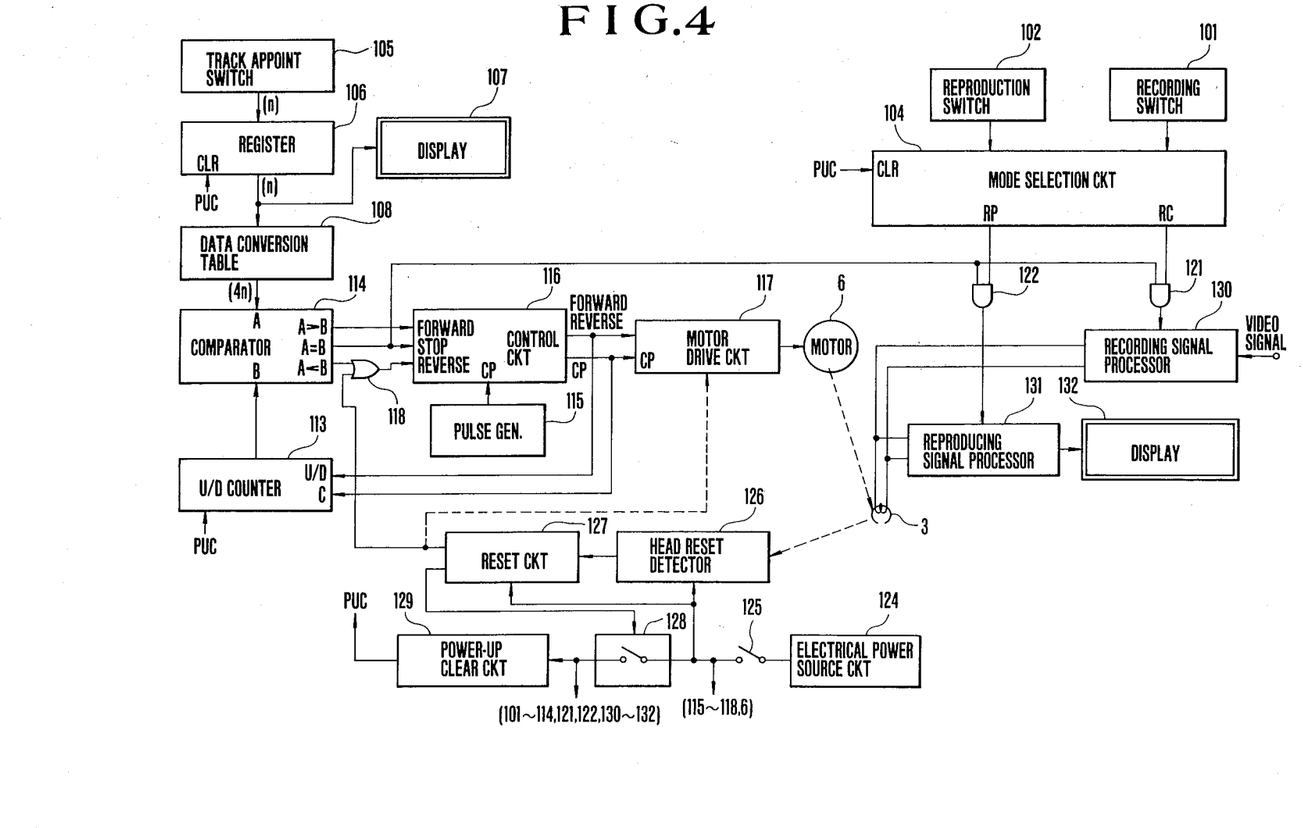
FIG. 4 is a block diagram of one embodiment of a control system according to the invention applied to the head shifting apparatus of FIG. 1.
Figure 5:
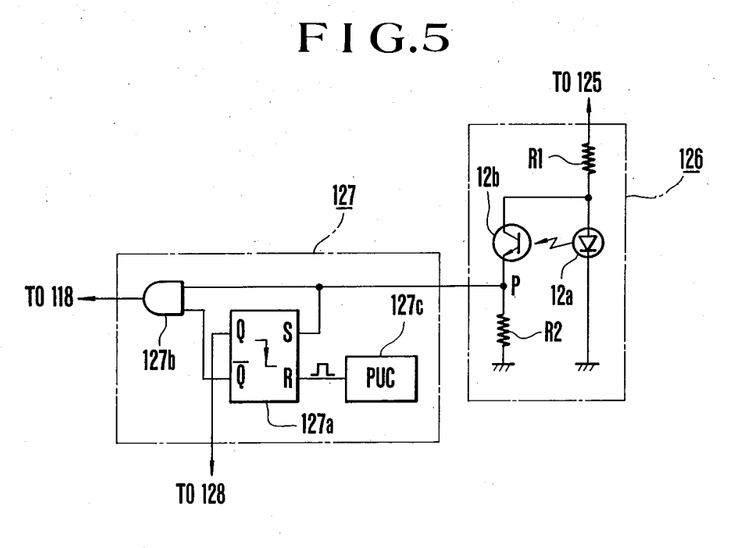
FIG. 5 is an electrical circuit diagram illustrating the details of the reference position detector and resetting circuit of FIG. 4.

A shutter plate 11, fixedly mounted on the head carriage 4, and a photo-coupler 12 constitute a head reset detector (126 of FIGS. 4 and 5).

Figure 2A:
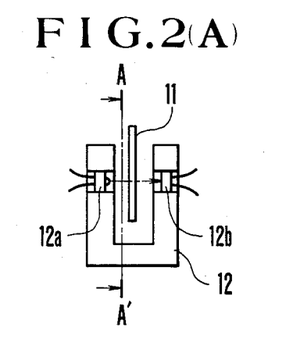
FIG. 2(A) is a side view illustrating the details of a shutter plate and a photo-coupler in the head shifting apparatus of FIG. 1.
Figure 2B:
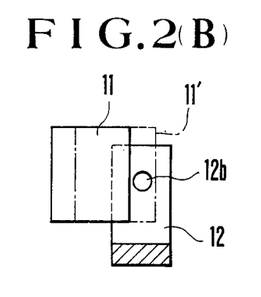
FIG. 2(B) is a sectional view taken along line A—A' of FIG. 2(A).

FIGS. 2(A) and 2(B) illustrate the details of the arrangement of the shutter plate 11 and the photo-coupler 12, FIG. 2(B) being a sectional view seen from line A—A' of FIG. 2(A). The photo-coupler 12, as is known in the art, comprises a light emitting element 12a such as a light emitting diode or the like and a light receiving element 12b such as a photo-transistor or the like. The arrangement of these parts is such that light from the emitting element 12a illuminates the receiving element 12b and the shutter plate 11 intervenes therebetween when the magnetic head 3 reaches the reference position (in a position indicated at 11' in FIG. 2(B)). When the light is blocked, the output of the receiving element 12b changes, which is utilized to detect that the magnetic head 3 has reached the predetermined reference position.

It is noted that, as the head reset detector, use may be made of other magnetic type means to produce an equivalent function.

Figure 3:
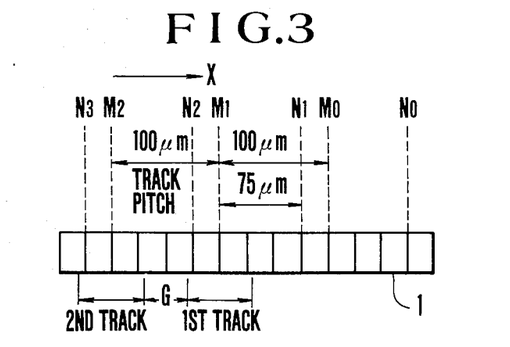
FIG. 3 is a diagram showing relationships between the head and the recording tracks in the head shifting apparatus of FIG. 1.

FIG. 3 illustrates the positional relation of the magnetic head relative to the magnetic sheet 1 either normally or accidentally in shifting the magnetic head 3 across each track in either direction to and from the reference position on the basis of a predetermined number of steps as an incremental unit of shifting. In FIG. 3, the magnetic sheet 1 has a track pitch of, for example, 100 $\mu$m, and the tracks are designated by a symbol M with subscripts 1, 2 . . . n, numbered consecutively from the outer periphery to the center (from right to left in FIG. 3). The reference position $M_0$ is set outwardly beyond the first track $M_1$ and corresponds to a position at which the shutter plate 11 just intercepts the optical path of the photo-coupler 12 which defines the magnetic head 3 shifting start point. The distance between the start point $M_0$ and the center of the first track $M_1$ is equal to the track pitch, or 100 $\mu$m. A general band between the successive tracks is identified by G. The magnetic head 3 is shifted through, for example, four steps as an incremental unit for each track pitch of 100 $\mu$m. According to the prior art, the shifting unit increment of the magnetic head 3 is unchanged from the four steps independent of whether the head 3 is shifted in a direction indicated by arrow X from an arbitrary position on the magnetic sheet 1 to the reference position $M_0$ to reset the apparatus, or in the opposite direction from the reference position $M_0$ to a desired or appointed position at which recording or reproducing is to be performed.

When the actually detected position coincides with the reference position $M_0$, as the magnetic head 3 reaches the desired position through the required number of unit increments each comprising four steps, the center of the magnetic head 3 is aligned with the first track at a point $M_1$, the second track at a point $M_2$, and the n-th track at a point $M_n$ which is spaced apart from the point $M_0$ by a distance equal to n times the track pitch. Thus, accurate recording or reproducing can be performed without any magnetic head 3 positioning or tracking error. However, if the magnetic head 3 is shifted toward the reference position, the center of the magnetic head 3 is aligned with an erroneous point $N_1$ by a four step shifting unit due to the external disturbance. The shutter plate 11 is not detected by the photo-coupler 12 yet, and proceeds through four more steps, so that the center of the magnetic head 3 reaches a point $N_0$ and is stopped in this position because the shutter plate 11 is detected by the photo-coupler 12 at a certain time on the way. Accordingly, the magetic head 3 is moved from the position that represents the coincidence of the center of the magnetic head 3 with the point $N_0$ to a desired position in the reverse direction to that indicated by arrow X in FIG. 3. In this case, the center of the magnetic head 3 is aligned with a point $N_1$ for the first track, with a point $N_2$ for the second track, $N_3$ for the third track, and so on, deviating from the correct point by an amount as large as 75 $\mu$m.

Accordingly, in one embodiment of the invention, when in the normal mode of recording or reproducing, the magnetic head 3 is shifted by a predetermined number of steps (in the aforesaid instance, four steps) in each shifting unit increment, and when switched to another mode for resetting the magnetic head 3 to the predetermined reference position $M_0$, the shifting unit increment of the magnetic head 3 is controlled by a smaller number of steps than that in the normal mode, preferably one step (25 $\mu$m in the numerical example of FIG. 3).

FIG. 4 illustrates a control system of the invention for the head shifting apparatus constructed in such a way that the magnetic head 3 is shifted by one step until the magnetic head 3 reaches the reference position and is then shifted from the reference position by four steps as a unit for each shifting pitch when in the normal mode of operation that follows after the magnetic head 3 is detected at the reference position. In FIG. 4, reference numeral 101 identifies a recording switch; reference numeral 102 identifies a reproducing switch and reference numeral 104 identifies a mode selection circuit. The mode selection circuit 104 is responsive to actuation of either one of the switches 101 and 102 and changes either its one output RC for the recording mode, or its other output RP for the reproducing mode, and maintains it at a high level. These outputs are given to respective recording and reproducing operation control AND gates 121 and 122 together with an enable signal which is produced when an "A=B" output of a comparator circuit 114 becomes high level. These AND gates 121 and 122 actuate recording and reproducing signal processing circuits 130 and 131 respectively.

A track appoint switch 105 appoints a desired track in the form of, for example, the ten key type. A register 106 stores data "n" related to the appointed track address appointed by the track appoint switch 105 and element 107 is a display device for displaying the appointed track address stored on the register 106. The display device 107 is preferably in the form of a small-sized display device comprising a liquid crystal cell, electrochronic element or light emitting diode. A data conversion table 108 comprises, for example, ROM, for producing, in this instance, "4n" as the head position setting data. Here, "4n" represents the number of steps through which the magnetic head 3 is shifted from the reference position to the n-th track and is expressed in binary coded digital form on the assumption that the step motor 6 takes four steps to shift the magnetic head 3 by one track pitch.

An up and down counter 113 (hereinafter called a U/D counter) detects the actual position of the magnetic head 3 shifted by the step motor 6. A digital comparator circuit 114 compares the output (called A) of the data conversion table 108 with the output (called B) of the U/D counter 113 to produce three different signals, depending on which of the two outputs A and B is larger or smaller, or represented by "A>B", "A=B" and "A<B". A pulse generator produces step control pulses by which the step motor 6 is driven. In the following, it will be assumed that each pulse of the step control pulse train represents a command for shifting the magnetic head 3 by one step. A control circuit 116 controls the motor 6 on the basis of the outputs of the comparator circuit 114 and the pulse generator 115. For example, in response to the high level output "A>B" of the comparator circuit 114, the control circuit 116 rotates the motor 6 in a forward direction. In response to the high level output "A<B", the rotation direction of the motor 6 is reversed. In response to the high level output "A=B", the supply of pulses to a drive circuit 117 to stop the motor 6 is cut off. It is noted that the control circuit 116 produces a train of pulses for driving the motor 6, and also produces a rotation direction appoint signal, and that this appoint signal when for example, of high level, represents the forward direction and when of low level, represents the reverse direction. A motor drive circuit 117 rotates the motor 6 in the appointed direction depending on the output of the control circuit 116. An OR gate 118 has two inputs which are connected to the output "A<B" of the comparator circuit 114 and the output of a resetting circuit 127, and has an output which is connected to the reverse rotation input of the control circuit 116.

Here, the magnetic head 3 is assumed to move in a direction to increase the track address when the motor 2 rotates in the forward direction, and to move in the opposite direction to decrease it when the motor 2 rotates in the reverse direction. The rotation direction appoint signal and pulses produced from the control circuit 116 are given as a count mode setting signal and count pulses respectively to the U/D counter 113. In this case, the U/D counter 113 operates in an up-counting mode by the high level of the rotation direction appoint signal, or the appointment of the forward direction, and operates on the down-counting mode by the low level thereof, that is, the appointment of the reverse direction.

An electrical power source circuit is identified by the reference numeral 124 and reference numeral 125 identifies a power switch. When the power switch 125 is thrown, current is supplied from the electrical power source circuit 124 to the pulse generator 115, control circuit 116, drive circuit 117, OR gate 118, pulse motor 6, a head reset detector 126 and reset circuit 127 to be more fully described later. A sheet rotating motor 2 may also be supplied with current from the power source circuit 124 by the closure of the power switch 125.

The head reset detector 126, as mentioned in connection with FIGS. 2 and 3, detects that the magnetic head 3 reaches the reference position ($M_0$ in FIG. 3) as it moves toward that position by the photo-coupler 12 of FIG. 2 and produces a head reset completion signal which is then applied to the reset circuit 127. The reset circuit 127 continues to supply a reset command signal for commanding the resetting of the magnetic head 3 to the reference position outwardly beyond the first track of the magnetic sheet (1 of FIG. 1) through the OR gate 118 to the control circuit 116 until resetting of the head 3 to the reference position $M_0$ is detected. In response to this reset command signal, the control circuit 116 produces the rotation direction appoint signal for rotating the motor 6 in the reverse direction and the output pulses until the reset command signal disappears.

FIG. 5 illustrates the details of the head reset detector 126 and the reset circuit 127, where the light emitting element (for example light emitting diode) 12a and the light receiving element (for example, photo-transistor) 12b are connected through a resistor R1 to the power switch 125, and also the light receiving element 12b is connected through a resistor R2 to the circuit ground. A junction point P of the light receiving element 12b and the resistor R2 is connected to a set input of a falling edge synchronizing type RS flip-flop 127a and a first input of an AND gate 127b. A power up clear circuit 127c, responsive to current supply resulting from the closure of the power switch 125, produces a high level pulse which is applied to a reset input of the RS flip-flop 127a. A Q output of the RS flip-flop 127a is connected to a control input of a switching circuit 128, and its $\overline{Q}$ output is connected to a second input of the AND gate 127b. The RS flip-flop 127a and the AND gate 127b are also supplied with current when the power switch 125 is thrown.

In such a circuit, when the power switch 125 is thrown, the power up clear circuit 127c produces a power up clear pulse whereby the RS flip-flop 127a is reset with its Q output becoming low level and its $\overline{Q}$ output becoming high level. If the magnetic head 3 is not in the reference position $M_0$ at a time when the power switch 125 is thrown, the light emanated from the light emitting element 12a is received by the light receiving element 12b, and the potential point at the point P becomes high level. Since the two inputs levels of the AND gate 127b simultaneously become high, their output levels become high. Therefore, the output of OR gate 118 becomes high level, causing the control circuit 116 to rotate the motor 6 in the reverse direction and the magnetic head 3 to move to the reference position $M_0$. When the magnetic head 3 reaches a position corresponding to the reference position $M_0$, the shutter plate 11 intercepts the optical path between the elements 12a and 12b, whereby the potential level at the point P becomes low. This potential change is given to the input of the RS flip-flop 127a and the flip-flop 127a is set so that its Q output level becomes high and its $\overline{Q}$ output level becomes low. Therefore, the output level of the AND gate 127b and, accordingly, the output level of the OR gate 118 becomes low, causing the control circuit 116 to stop the motor 6. After that, when the magnetic head 3 is moved away from the reference position to an appointed track position, the interception of the optical path between the elements 12a and 12b by the shutter plate 11 is released, and the potential level at the point P becomes high again. But since the RS flip-flop 127a is of the falling edge synchronizing type, the aforesaid set condition does not change.

Returning to FIG. 4, when the Q output level of the RS flip-flop 127a changes to high, as this reaches the control input of the switching circuit 128, the circuit 128 turns on, whereby all the circuit portions other than those which were supplied with current from the power source circuit 124 when the switch 125 was closed are supplied with current from the circuit 124. At the same time, the power up clear circuit 129 is actuated so that the mode selection circuit 104, the register 106 and the U/D counter 113 are given the power up clear pulse (PUC) and these circuits are cleared or reset.

A recording signal processing circuit 130 supplies video signals to the magnetic head 3 to effect recording on the magnetic sheet 1 and a reproducing signal processing circuit 131 reproduces the signals picked up by the magnetic head 3 from the sheet 1. These circuits 130 and 131 are controlled by the AND gates 121 and 122 respectively, as has been described above. A display device 132 displays the reproduced signals. The reproduced signals may be connected to an output device such as a printer.

The operation of the control system of such a construction and the above apparatus, using the same, will be explained now.

When the power switch 125 is thrown, the pulse generator 125, the control circuit 116, the drive circuit 117, the OR gate 118, the head reset detector 126, the reset circuit 127, the pulse motor 6 and, if necessary, the sheet rotating motor 2 of FIG. 1 are supplied with current from the power source circuit 124. The reset circuit 127 supplies the aforesaid reset command signal through the OR gate 118 to the control circuit 116 until the magnetic head 3 is reset to the aforesaid reference position $M_0$. Thereby, the control circuit 116 changes the rotation direction appoint signal to a low level, causing the drive circuit 117 to rotate the motor 6 in the reverse direction with the help of the step control pulses from the pulse generator 115. As a result, the magnetic head 3 when initially not at the reference position $M_0$, is moved until it reaches the reference position $M_0$. When the magnetic head 3 reaches the reference position $M_0$, the head reset detector 126 detects this and changes its output (potential at point P of FIG. 5) to a low level. Therefore, the reset circuit 127 no longer produces the reset command signal to the control circuit 116. At this time, therefore, the motor 6 is stopped. Such an output change of the head reset detector 126 to a low level also causes the Q output of the flip-flop 127a of FIG. 5 to change to a high level which, in turn, causes the switching circuit 128 to turn on. Thereby, all the circuits other than those which were supplied with current from the power source circuit 124 when the power switch 125 was thrown are supplied with current from the circuit 124. In response to the power supply, the power up clear circuit 129 produces a power up clear pulse which is applied to the mode selection circuit 104, the register 106 and the U/D counter 113 and these circuits are cleared or reset. Therefore, the display device 107 indicates zero in track address.

Then, when a desired track address is set by the track appoint switch 105, that track address data "n" is stored in the register 106 and is displayed by the display device 107. The data table 108 produces data "4n" which is given to the input A of the comparator circuit 114. Applied to another input B of the comparator circuit 114 is the output of the U/D counter 113 which is, at this time, "zero". Therefore, the "A>B" output level of the comparator circuit 114 becomes high. In response to the high output level of "A>B", the control circuit 116 changes its rotation direction appoint signal to a high level, appointing the forward rotation direction of the motor 6 and puts out the motor step control pulses produced from the pulse generator 115. As a result, the drive circuit 117 rotates the motor 6 in the forward direction, and the magnetic head 3 is moved from the reference position $M_0$ to the appointed track position of the n-th address. The forward rotation command from the control circuit 116 operates the U/D counter 113 in the up-counting mode counting the motor step control pulses corresponding to the stepwise shifting of the magnetic head 3. When the magnetic head 3 arrives at the track position of the n-th address, it is at this time that the U/D counter 113 has counted the 4n pulses. Therefore, of the outputs of the comparator circuit 114, "A=B" becomes high level. Thereby, the control circuit 116 stops the output of the motor step control pulses. Therefore, the motor 6 stops and the magnetic head 3 stops in this track position of the n-th address.

The magnetic head 3 is shifted one step at a time until the magnetic head 3 reaches the reference position $M_0$ and when the magnetic head 3 is shifted from the reference position $M_0$ to the appointed track position, the incremental unit of shifting constitutes four steps. Since the alignment of the magnetic head 3 to the reference position $M_0$ is performed one step at a time without producing a positional error of the magnetic head 3 as has been described in connection with FIG. 3, adjustment of the magnetic head 3 to the reference position $M_0$ can be highly accurate. This assures that later shifting of the magnetic head 3 in four steps for every one track pitch can be performed with highly accurate alignment. Furthermore, according to one of the features of the system of FIG. 4, each time the power switch 125 is thrown, resetting of the magnetic head 3 to the reference position $M_0$ is repeated insuring that when in the recording or reproducing mode, the center of the magnetic head 3 can be accurately aligned with any track on the recording medium. Notice that the terms "four steps" and "one step" used herein are intended to exemplify the different unit increments depending upon the shifting directions. It is essential in the actual practice of the invention that a unit increment of shifting of the magnetic head 3 in the direction to the reference position is smaller than that in involved in shifting in the magnetic head 3 to a desired track in the normal mode of operation. Also, although the aforesaid embodiment includes the data conversion table 108 which converts the track address data of "n" from the track appoint switch 105 into the data of "4n" which is then compared with the counted value of the U/D counter 113, the use of another form of the U/D counter 113 that counts one for every four pulses will provide direct comparison of the track address data "n" with the output of the U/D counter 113 without recourse to the data conversion table 108.

Next, to move the magnetic head 3 to a different track position of an n'-th address after completion of recording or reproducing at the n-th track position, the operator sets the n'-th address by the track appoint switch 105. At this time, depending upon which of the "n" and "n'" is larger or smaller, either one of the "A>B" and "A<B" outputs of the comparator circuit 114 becomes high level, depending on the direction of rotation of the motor 6 and determination of the counting mode of the U/D counter 113. In principle, the magnetic head 3 is moved from the n-th to the n'-th track position similar to the way in which the reference position $M_0$ is moved to the n-th track position as has been described above, or in the same unit increment of four steps even when the new number "n'" is newer than the number "n".

Finally, the recording or reproducing mode of operation is explained below. With the magnetic head 3 brought to and stopped in the track position of the appointed address, when the recording switch 101 or the reproducing switch 102 is actuated, the mode selection circuit 104 changes either its recording mode control output RC or its reproducing mode control output RP to high level. Since in the stopped state of the magnetic head 3 the "A=B" output of the comparator circuit 114 is high level, the corresponding outputs of AND gates 121 and 122 become high level. If the high level output is produced from the AND gate 121, the recording signal processing circuit 130 is rendered operative. The video signal is processed by this processing circuit 130 for recording and is recorded through the magnetic head 3 on the appointed address track of the magnetic sheet 1 in one frame or in one field. A video signal source may be a video camera which may be included in the recording and reproducing apparatus or separate therefrom, or a television receiver set. If the high level output is produced from the AND gate 122, the reproducing signal processing circuit 131 is rendered operative and the video signal recorded at the track of the appointed address on the magnetic sheet 1 is picked up through the magnetic head 3 and is processed by this processing circuit 131. The processed video signal is applied to the display device 132 or another output device, for example, a printer. The aforesaid recording or reproducing mode is released when the power switch 125 is opened, and the mode selection circuit 104 is cleared by the aforesaid power up clear pulse.

The foregoing embodiment has been described using an example of the invention with one of the types of head shifting apparatus which is adapted to the recording and/or reproducing system, using the disc type magnetic sheets 1 as the recording medium. Besides this, the principles of the invention are fully applicable to other types of head shifting apparatus such as those in the recording and/or reproducing system using a rotary type magnetic drum as the recording medium. They are also applicable to the printer or recorder that necessitates head scanning against the recording paper and, furthermore, to the read out device that necessitates scanning of the head (for example, CCD or photo-electric scanning head) against the manuscript paper or similar image bearing medium. Therefore, it is to be understood that the present invention is not confined to the illustrated embodiment, but is applicable to a wide variety of head shifting apparatus.

Also in the illustrated embodiment, the degree of rotation of the output shaft 7 of the motor 6 in one basic step for one clock pulse from the control circuit 116, that is, the amount of shifting of the magnetic head 3 in one basic step is an equal value in the opposing directions, and this is used as a basis in differentiating the shifting increments in the opposed directions from each other. Instead of using such means, it is also possible to otherwise construct, for example, the drive circuit 117 in another form such that the magnetized phase of the motor 6 is changed over. As illustrated by a dashed line in FIG. 4, the output of the reset circuit 127 also is even connected to the drive circuit 117 so that when the output level of the reset circuit 127 is high, the motor 6 is operated in a predetermined first magnetizing mode, thereby conforming with the aforesaid example. The magnetic head 3 is shifted by 25 μm for each clock pulse, and when the output level of the reset circuit 127 is low, the motor 6 is operated in a different, or second magnetizing mode, whereby the magnetic head 3 is shifted by 100 μm for each clock pulse. In this case, it is obvious that the data conversion table 108 becomes unnecessary.

What I claim:

1. An apparatus for shifting a head, comprising:
   (A) shifting means for shifting the head in a stepwise manner;
   (B) detection means for detecting that the head has reached a predetermined position; and
   (C) control means responsive to said detection means for controlling said shifting means, said control means causing said shifting means to operate in such a manner that, in order to set said head at said predetermined position, shifting of said head is performed in a first shifting mode with a predetermined first shift amount as one step until said detection means detects that said head reaches the predetermined position, and after the detection means detects that said head has reached the predetermined position, shifting of said head is performed in a second shifting mode with a predetermined second shift amount as one step larger than said first shift amount.

2. An apparatus according to claim 1, wherein said shifting means has a predetermined unit shifting pitch; and wherein said control means controls said shifting means in such a manner that said first shift amount coincides with a predetermined first unit shifting pitch number and when said second shift amount coincides with a predetermined second unit shifting pitch number greater than said first unit shifting pitch number.

3. An apparatus according to claim 2, wherein said shifting means includes:
   a step motor having an output shaft rotating in a stepwise manner; and
   a conversion mechanism for converting the stepwise rotation of said output shaft of said step motor into a stepwise and linear movement of the head, said mechanism coupled to the head and to the output shaft of the step motor;
   and wherein said control means is arranged to control said step motor.

4. An apparatus according to claim 1, wherein said shifting means includes:
   a step motor having an output shaft rotating in a stepwise manner; and
   a conversion mechanism for converting the stepwise rotation of said output shaft of said step motor into a stepwise and linear movement of the head, said mechanism coupled to the head and to the output shaft of the step motor;
   and wherein said control means is arranged to control said step motor.

5. An apparatus according to claim 1, wherein said detection means includes a memory circuit for memorizing that the head reached said predetermined position;
   and wherein said control means is coupled to said memory circuit.

6. An apparatus according to claim 5, wherein said detection means further includes:
   a photo-coupler having a light emitting element and a light receiving element responsive to a light emanated from said light emitting element; and
   a light interrupting member for interrupting the light impinging upon said light receiving element;

one of said photo-coupler and said light interrupting member being coupled to said shifting means so that the photo-coupler and the light interrupting member are relatively moved in accordance with the shifting of the head by the shifting means and the light receiving condition of said light receiving element is changed when the head reached said predetermined position;

and wherein said memory circuit is arranged to memorize that the head reached said predetermined position in response to the change in the light receiving condition of said light receiving element of said photo-coupler.

7. An apparatus according to claim 5, wherein said detection means further includes:
a fixed first member; and
a movable second member coupled to said shifting means so that the second member is moved relative to said first member in accordance with the shifting of the head by the shifting means and assumes a predetermined relative position relative to the first member when the head reached said predetermined position;
one of said first and second member having means for producing an electrical signal which changes when the second member assumed said predetermined relative position relative to the first member;
and wherein said memory circuit is arranged to memorize that the head reached said predetermined position in response to the change in the electrical signal produced from said signal producing means.

8. An apparatus according to claim 1, wherein said detection means includes:
a photo-coupler having a light emitting element and a light receiving element responsive to a light emanated from said light emitting element; and
a light interrupting member for interrupting the light impinging upon said light receiving element;
one of said photo-coupler and said light interrupting member being coupled to said shifting means so that the photo-coupler and the light interrupting member are relatively moved in accordance with the shifting of the head by the shifting means and the light receiving condition of said light receiving element is changed when the head reached said predetermined position;
and wherein said control means is response to the change in the light receiving condition of said light receiving element of said photo-coupler.

9. An apparatus according to claim 1, wherein said detection means includes:
a fixed first member; and
a movable second member coupled to said shifting means so that the second member is moved relative to said first member in accordance with the shifting of the head by the shifting means and assumes a predetermined relative position relative to the first member when the head reached said predetermined position;
one of said first and second member having means for producing an electrical signal which changes when the second member assumed said predetermined relative position relative to the first member;
and wherein said control means is response to the change in the electrical signal produced from said signal producing means.

10. An apparatus according to claim 1, further comprising:

initiation means for initiating the operation of the apparatus;
said control means being responsive to said initiation means and causing said shifting means to shift the head toward said predetermined position according to said first shift mode.

11. An apparatus for moving a load, comprising:
(A) moving means for moving the load in a stepwise manner;
(B) detection means for detecting that the load has reached a predetermined position; and
(C) control means responsive to said detection means for controlling said shifting means said control means causing said moving means to operate in such a manner that moving of said load is performed in a first moving mode with a predetermined first movement amount as a step until said detection means detects that said load reached said predetermined position, and after the detection means detects that the load has reached the predetermined position, moving of the load is performed in a second moving mode with a predetermined second movement amount as a unit larger than said first movement amount.

12. An apparatus according to claim 11, wherein said moving means has a predetermined unit moving pitch;
and wherein said control means controls said moving means in such a manner that said first movement amount coincides with a predetermined first unit moving pitch number and said second movement amount coincides with a predetermined second unit moving pitch number greater than said first unit moving pitch number.

13. An apparatus according to claim 12, wherein said moving means includes:
a step motor having an output shaft rotating in a stepwise manner; and
a conversion mechanism for converting the stepwise rotation of said output shaft of said step motor into a stepwise and linear movement of the load, said mechanism coupled to the load and to the output shaft of the step motor;
and wherein said control means is arranged to control said step motor.

14. An apparatus according to claim 11, wherein said moving means includes:
a step motor having an output shaft rotating in a stepwise manner; and
a conversion mechanism for converting the stepwise rotation of said output shaft of said step motor into a stepwise and linear movement of the load, said mechanism coupled to the load and to the output shaft of the step motor;
and wherein said control means is arranged to control said step motor.

15. An apparatus according to claim 11, wherein said detection means includes a memory circuit for memorizing that the load reached said predetermined position;
and wherein said control means is coupled to said memory circuit.

16. An apparatus according to claim 15, wherein said detection means further includes:
a photo-coupler having a light emitting element and a light receiving element responsive to a light emanated from said light emitting element; and
a light interrupting member for interrupting the light impinging upon said light receiving element;

one of said photo-coupler and said light interrupting member being coupled to said moving means so that the photo-coupler and the light interrupting member are relatively moved in accordance with the moving of the load by the moving means and the light receiving condition of said light receiving element is changed when the load reached said predetermined position;

and wherein said memory circuit is arranged to memorize that the load reached said predetermined position in response to the change in the light receiving condition of said light receiving element of said photo-coupler.

17. An apparatus according to claim 15, wherein said detection means further includes:

a fixed first member; and a movable second member coupled to said moving means so that the second member is moved relative to said first member in accordance with the moving of the load by the moving means and assumes a predetermined relative position relative to the first member when the load reached said predetermined position;

one of said first and second member having means for producing an electrical signal which changes when the second member assumed said predetermined relative position relative to the first member;

and wherein said memory circuit is arranged to memorize that the load reached said predetermined position in response to the change in the electrical signal produced from said signal producing means.

18. An apparatus according to claim 11, wherein said detection means includes:

a photo-coupler having a light emitting element and a light receiving element responsive to a light emanated from said light emitting element; and a light interrupting member for interrupting the light impinging upon said light receiving element;

one of said photo-coupler and said light interrupting member being coupled to said moving means so that the photo-coupler and the light interrupting member are relatively moved in accordance with the moving of the load by the moving means and the light receiving condition of said light receiving element is changed when the load reached said predetermined position;

and wherein said control means is reponse to the change in the light receiving condition of said light receiving element of said photo-coupler.

19. An apparatus according to claim 11, wherein said detection means includes:

a fixed first member; and a movable second member coupled to said moving means so that the second member is moved relative to said first member in accordance with the moving of the load by the moving means and assumes a predetermined relative position relative to the first member when the load reached said predetermined position;

one of said first and second member having means for producing an electrical signal which changes when the second member assumed said predetermined relative position relative to the first member;

and wherein said control means is response to the change in the electrical signal produced from said signal producing means.

20. An apparatus according to claim 11, further comprising:

initiation means for initiating the operation of the apparatus;

said control means being responsive to said initiation means and causing said moving means to move the load toward said predetermined position according to said first shift mode.

21. A recording and/or reproducing apparatus using a record bearing medium, comprising:

(A) drive means for driving the record bearing medium;

(B) head means for recording signals on and/or reproducing recorded signals from the medium;

(C) moving means for moving said head means relative to the medium in a stepwise manner;

(D) detection means for producing a characteristic output upon detecting that said head means is set at a predetermined position; and (E) control means responsive to said characteristic output of said detection means for controlling said moving means, said control means causing said moving means to operate in such a manner that when said head means is to be set to said predetermined position, said head means is moved according to a predetermined first moving pitch as one step until the detection means produces the characteristic output, and after that, the head means is moved according to a second moving pitch greater than the first moving pitch.

22. An apparatus according to claim 21, wherein said moving means has a predetermined unit moving pitch; and wherein said control means controls said moving means so that said first moving pitch coincides with a predetermined first unit moving pitch number and said second moving pitch coincides with a predetermined second unit moving pitch number greater than the first unit moving pitch number.

23. An apparatus according to claim 22, wherein said first moving pitch is equal to said unit moving pitch.

24. A recording and/or reproducing apparatus using a rotary type record bearing medium, comprising:

(A) a first motor for rotating the record bearing medium;

(B) a head for recording signals and/or reproducing recorded signals from the medium;

(C) a second motor having a rotating member rotating in a stepwise manner;

(D) a conversion mechanism disposed between said second motor and said head for converting the stepwise rotation of said rotating member of the second motor into a stepwise and linear movement of the head relative to the medium;

(E) a detector operatively coupled to said head for producing a characteristic output upon detecting that the head is reset at a predetermined reset position; and (F) a control circuit responsive to said characteristic output of said detector for controlling said second motor, said control circuit controlling the second motor in such a manner that when said head is to be set, said head is moved in a predetermined first moving pitch as one step by the rotating member of the second motor until the detector produces the characteristic output, and after that, the head is moved by a predetermined second moving pitch as one step greater than said first moving pitch.

25. An apparatus according to claim 24, wherein said second motor has a predetermined unit rotation pitch of said rotating member; and wherein said control circuit controls said second motor so that said first moving pitch corresponds to a predetermined first unit rotation pitch number and said second moving pitch corresponds to a predetermined second unit rotation pitch number greater than the first unit rotation pitch number.

* * * * *